(12) United States Patent
Schürmann et al.

(10) Patent No.: US 11,129,368 B2
(45) Date of Patent: Sep. 28, 2021

(54) WEIGHING MODULE FOR A NEST IN A POULTRY MANAGEMENT SYSTEM AND NEST

(71) Applicant: BIG DUTCHMAN INTERNATIONAL GmbH, Vechta (DE)

(72) Inventors: Michael Schürmann, Friesoythe (DE); Johann Henrich Grave, Schwichteler (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 683 days.

(21) Appl. No.: 15/728,627

(22) Filed: Oct. 10, 2017

(65) Prior Publication Data

US 2018/0098528 A1    Apr. 12, 2018

(30) Foreign Application Priority Data

Oct. 12, 2016 (DE) .................. 20 2016 105709.4

(51) Int. Cl.

| A01K 31/16 | (2006.01) |
|---|---|
| A01K 31/00 | (2006.01) |
| A01K 35/00 | (2006.01) |
| A01K 39/012 | (2006.01) |
| A01K 45/00 | (2006.01) |
| G01G 17/08 | (2006.01) |
| G01G 19/00 | (2006.01) |
| G01G 21/22 | (2006.01) |

(52) U.S. Cl.
CPC .......... *A01K 31/165* (2013.01); *A01K 31/005* (2013.01); *A01K 35/00* (2013.01); *A01K 39/0125* (2013.01); *A01K 45/00* (2013.01); *G01G 17/08* (2013.01); *G01G 19/00* (2013.01); *G01G 21/22* (2013.01)

(58) Field of Classification Search
CPC .... A01K 31/165; A01K 31/005; A01K 31/00; A01K 45/00; G01G 17/08; G01G 19/00; G01G 21/22
USPC ........................................................ 119/347
See application file for complete search history.

(56) References Cited

U.S. PATENT DOCUMENTS

| 2,218,423 | A | * | 10/1940 | Harnar | .................. | G06M 1/086 |
| | | | | | | 119/174 |
| 2,279,147 | A | * | 4/1942 | Stimson | .................. | A01K 31/16 |
| | | | | | | 119/336 |
| 2,633,826 | A | * | 4/1953 | Hansen | .................. | A01K 31/16 |
| | | | | | | 119/335 |
| 2,692,578 | A | * | 10/1954 | Manning | ................ | A01K 31/16 |
| | | | | | | 119/335 |

(Continued)

FOREIGN PATENT DOCUMENTS

| CN | 202406815 U | 9/2012 | ............ A01K 61/00 |
| CN | 10304447 A | 11/2013 | |

(Continued)

*Primary Examiner* — Ebony E Evans
(74) *Attorney, Agent, or Firm* — Price Heneveld LLP (57) ABSTRACT

A weighing module for a nest in a poultry management system comprises a floor for receiving poultry or a nesting pad and a mounting device with which the weighing module can be attached to an animal holding installation, wherein the floor is supported by a weighing element.

23 Claims, 10 Drawing Sheets

(56) References Cited

U.S. PATENT DOCUMENTS

| | | | | |
|---|---|---|---|---|
| 4,049,950 A * | 9/1977 | Byrne | ................ | A01K 11/006 235/376 |
| 4,288,856 A * | 9/1981 | Linseth | ................ | A01K 11/006 119/841 |
| 4,811,694 A * | 3/1989 | Holmquist | ................ | A01K 29/00 116/1 |
| 4,821,823 A * | 4/1989 | Skibinski | ................ | G01G 21/23 177/256 |
| 4,920,923 A | 5/1990 | Hosoya | | |
| 5,365,878 A * | 11/1994 | Dyer | ................ | A01K 31/007 119/347 |
| 6,314,909 B1 * | 11/2001 | Horwood | ................ | A01K 29/00 119/51.02 |
| 6,394,031 B1 | 5/2002 | Möller | | |
| 6,521,847 B1 * | 2/2003 | Ostermann | ................ | G01G 17/08 177/134 |
| 2002/0120402 A1 * | 8/2002 | Burghardi | ................ | A01K 5/02 702/19 |
| 2004/0089244 A1 * | 5/2004 | Marshall | ................ | A01K 39/0113 119/428 |
| 2009/0126646 A1 * | 5/2009 | Johnston | ................ | A01K 31/16 119/338 |
| 2009/0294248 A1 * | 12/2009 | Sudkamp | ................ | A01K 43/00 198/341.03 |
| 2009/0320761 A1 * | 12/2009 | Grave | ................ | A01K 5/0233 119/51.02 |
| 2012/0299731 A1 * | 11/2012 | Triener | ................ | G16Z 99/00 340/573.1 |
| 2013/0047930 A1 * | 2/2013 | Risser | ................ | A01K 31/007 119/450 |
| 2013/0108120 A1 * | 5/2013 | Van De Loo | ................ | A01K 45/00 382/110 |
| 2015/0136862 A1 * | 5/2015 | Wolf, II | ................ | F24S 50/40 236/10 |
| 2016/0050888 A1 * | 2/2016 | Berckmans | ................ | A01K 29/005 119/51.02 |
| 2016/0323971 A1 * | 11/2016 | Theobald | ................ | H04N 5/2354 |
| 2018/0242889 A1 * | 8/2018 | Izumo | ................ | G01G 17/08 |
| 2020/0137987 A1 * | 5/2020 | Wu | ................ | A01K 45/00 |

FOREIGN PATENT DOCUMENTS

| | | | | |
|---|---|---|---|---|
| CN | 10340447 A | 11/2013 | | |
| CN | 103404447 A | 11/2013 | ............. | A01K 31/18 |
| CN | 103548712 | 2/2014 | | |
| CN | 104041429 | 9/2014 | | |
| CN | 104041429 A | 9/2014 | ............. | A01K 45/00 |
| CN | 104686390 | 6/2015 | | |
| CN | 104839034 | 8/2015 | | |
| CN | 104839034 A | 8/2015 | ............. | A01K 1/00 |
| CN | 205052492 | 3/2016 | | |
| CN | 205052492 U | 3/2016 | ............. | A01K 31/00 |
| DE | 1035391 | 7/1958 | | |
| DE | 4203637 | 8/1993 | | |
| DE | 19730652 | 1/1999 | | |
| DE | 10027124 | 10/2001 | | |
| DE | 202015101803 | 5/2015 | | |
| EP | 1736047 | 12/2006 | | |
| EP | 2011392 | 1/2009 | | |
| EP | 2022327 | 2/2009 | | |
| FR | 2801471 | 6/2001 | | |
| FR | 2998135 | 5/2014 | | |
| GB | 1461384 | 1/1977 | | |
| JP | 58832 | 1/1983 | | |
| JP | 5973735 | 4/1984 | | |
| JP | S5973735 A | 4/1984 | ............. | G01G 17/08 |
| WO | 2005099448 | 10/2005 | | |
| WO | 2016192602 | 12/2016 | | |

* cited by examiner

WEIGHING MODULE FOR A NEST IN A POULTRY MANAGEMENT SYSTEM AND NEST

CROSS-REFERENCE TO FOREIGN PRIORITY APPLICATION

The present application claims the benefit under 35 U.S.C. § 119(b) of German Application No. DE 20 2016 105709.4 filed Oct. 12, 2016, titled "Weighing Module for a Nest in a Poultry Management System and Nest."

FIELD OF THE INVENTION

The present invention relates to a weighing module for a nest in a poultry management system, a nest for a poultry management system and a method of weighing poultry.

BACKGROUND OF THE INVENTION

Animal holding areas, in particular nests, for poultry management are known, for example, from U.S. Pat. No. 6,394,031B1, CN103548712A, DE4203637C2, DE10027124C1, DE19730652A1, DE202015101803U1, EP1736047A1, EP2011392B1, EP2022327A1, FR2801471A1 or GB1461384A. While existing solutions already offer various advantages, further improvements are desirable.

Therefore, it is an object of the present invention to provide a weighing module for a nest in a poultry management system, a nest for a poultry management system and a method of weighing poultry which improve existing solutions. It is, in particular, an object of the present invention to provide a weighing module for a nest in a poultry management system, a nest for a poultry management system and a method for weighing poultry which have an improved functionality and/or an additional function compared to existing solutions.

SUMMARY OF THE INVENTION

Pursuant to a first aspect of the invention, said object is achieved by means of a weighing module for a nest in a poultry management system comprising a floor for receiving poultry and/or a nesting pad and a mounting device with which the weighing module can be attached at an animal holding installation, in particular at a nest installation, wherein the floor is supported by a weighing element.

The floor of the weighing module is preferably arranged and designed in such a way that the poultry can step directly onto the floor and/or can stay directly on the floor. In addition or alternatively, the floor of the weighing module may be arranged and designed in such a way that a nesting pad, for example a mat insert, can be arranged on top of it so that the poultry can subsequently step on and/or stay on said mat insert.

The mounting device of the weighing module generally serves the purpose of attaching the weighing module to an animal holding installation. The animal holding installation is preferably arranged as a part of an animal holding area in a poultry house, wherein a poultry house will usually comprise a plurality of animal holding installations. Preferably, all or a part of the animal holding installations of a poultry house may be equipped with a weighing module pursuant to the invention. Preferably, an animal holding installation may be designed as a single animal holding installation, which means, in particular, animal holding installations that are designed for the stay of one single poultry animal. The mounting device of the weighing module serves to attach the weighing module to a nest installation, for example, at a nest housing. The nest is preferably arranged as a part of an animal holding area in a poultry house, wherein a poultry house will usually comprise a plurality of nests. Preferably, all or a part of the nests of a poultry house may be equipped with a weighing module pursuant to the invention.

The weighing module may be attached by means of the mounting device preferably at a nest housing. The nest housing may belong to a single nest or a group nest. A single nest is preferably designed for the stay of a single poultry animal. A group nest is preferably designed for the simultaneous stay of two, three, or more poultry animals. Preferably, the weighing module intended for use in a single nest is configured to determine the weight of a single poultry animal. Preferably, the weighing module intended for use in a group nest is configured to determine the weight of all the poultry in the nest and/or to determine the weight of individual poultry animals, in particular, the weight of individual poultry animals entering and/or leaving the group nest.

The mounting device may also serve the purpose of attaching the weighing module at an installation for the individual feeding of poultry. The installation for the individual feeding of poultry is preferably arranged as a part of an animal holding area in a poultry house, wherein a poultry house will usually comprise a plurality of installations for the individual feeding of poultry. Preferably, all or a part of the installations for the individual feeding of poultry of a poultry house may be equipped with a weighing module pursuant to the invention. It is also possible that an animal holding installation has both the function of a single nest and the function of an installation for the individual feeding of poultry.

Furthermore, the floor is preferably supported by the weighing element at the mounting device. It is particularly preferable that the weighing element is arranged between the mounting device and the floor. A weighing element may, for example, be designed as a weighing cell.

The weighing module pursuant to the invention makes it possible to weigh poultry during their stay in the nest, in particular, indirectly or directly on the floor of the weighing module. The determination of the weight is an important key figure in poultry management, since, for example, feeding and/or the removal from the house depend (among other things) on the weight of the poultry. The invention is based, inter alia, on the finding that, on the one hand, in most cases it is individual poultry animals that are staying in the nesting area and, on the other hand, that, while they are in the nesting area, they stay relatively calm and do not move much for a period of time such that it is sufficient for weighing and/or a weighing process. Thus, the weighing module pursuant to the invention enables a weighing of the poultry which is integrated in the nest and allows for a particularly gentle and/or accurate determination of the weight of the poultry.

Respective advantages can also be achieved if the weighing module is arranged in an installation for the individual feeding of poultry. In this arrangement, for example, a change in weight can be determined by comparing the weight when the animal enters the installation for the individual feeding of poultry with the weight when the animal leaves the installation for the individual feeding of poultry, which allows, for example, conclusions regarding the ingestion of feed during the stay in the installation for the individual feeding of poultry. Furthermore, the determination of the feed ingestion of the individual animal allows for conclusions regarding the feed conversion rate of the individual animal, which can be used for the optimization of the house, feed, and/or growth management. Moreover, the feed ingestion, in particular, changes in the feeding behavior inferred from a comparison with historical and/or forecast values, can be used for identifying indications of disease early on. Thus, disease outbreaks can be identified early and the use of medicines can be reduced or prevented, which contributes to the animal wellbeing.

Pursuant to a preferred embodiment, it is required that the floor is supported by two, three, or several, in particular, four, weighing elements. It is, in particular, preferred that the floor is supported on two opposite sides by one weighing element respectively, preferably by two weighing elements, respectively. The support of a floor by several weighing elements at the mounting device has the advantage that an even determination of the weight can take place. It is in particular preferred that four weighing elements are provided that are preferably arranged in the area of the corners of an essentially rectangular or square floor. To this end, for example, two weighing elements, respectively, may be arranged on opposite sides of the floor, for example, on the two short sides of a rectangular floor.

Preferably, the mounting device comprises two or more mounting elements, wherein preferably one mounting element, respectively, is arranged on two opposite sides of the floor, wherein preferably each of the two mounting elements is connected to the corner areas of the floor on the respective side via two weighing elements arranged on two opposite ends of the holding element.

A preferred further embodiment is characterized in that, during operation, the floor is slanted towards the horizontal, in particular towards a horizontal plane. Such slanting of the floor of a nest is particularly preferred in order to facilitate for example the rolling of eggs from the floor to an egg receiving installation. The slant is preferably between 1° and 45°, preferably up to 30°, to 20°, to 15°, to 10°, or to 5°.

In another preferred embodiment it is required that during operation two opposite edges of the floor, in particular, an upper edge of the floor and a lower edge of the floor, are attached to a guide rail, respectively. Preferably, the guiderails serve the purpose of attaching the floor to the mounting device, furthermore preferably via the weighing elements. The weighing elements are preferably arranged on the sides or edges of the floor where no guiderail is located.

It is furthermore preferred that during operation an upper edge of the floor is supported by one spacer element or several spacer elements. A spacer element may, for example, be designed as a U-profile. The provision of one or several spacer element(s) leads in a particularly simple manner to a slanted arrangement of the floor. Preferably, the spacer elements are located between a weighing element and the guide rail on which, during operation, the upper edge of the floor is arranged.

Another preferred embodiment is characterized in a transmission device which is arranged and configured to transmit data determined by the weighing element. The data regarding the weight of a poultry animal on the floor determined by the weighing element or the weighing elements of the weighing module may preferably be transferred, for example, to a central evaluation unit. The data transfer may be executed in a wireless or wired manner. Furthermore, in addition to the data determined by the weighing elements, the data transfer may include other data, such as a time stamp or an identification number of the poultry animal, which can, for example, be identified by means of a corresponding identification reader, such as radio frequency identification (RFID) reader. Thus, the exploitation of the data can be improved.

Preferably, the data transfer may take place after each weighing process. Preferably, the beginning of a weighing process is detected when the weighing element(s) determine(s) a weight of zero or a weight below a predefined threshold value and when this weight then increases, preferably increases beyond a predefined threshold value, which indicates that a poultry animal has stepped onto the floor. Preferably, the weighing module is arranged and configured to automatically start a weighing process and/or to automatically execute a determination of weight when a poultry animal steps onto the floor and/or when one or several weighing cells detect a change in weight exceeding a predefined threshold value.

Furthermore, the data is preferably also able to be stored in the weighing module, for example, in a storage element. In addition, it is preferable that the data pertaining to several weighing processes is transferred in a bundled manner, for example, at certain intervals, such as daily.

Furthermore, it is preferred that the weighing module is configured to determine a value for a weight of a poultry animal from the data determined by the weighing element(s) and/or to determine a value for the weight of a poultry animal on the basis of a total weight difference. Especially if two or several weighing elements are provided, it will be advantageous to have the weight of the poultry animal determined from the data of all weighing elements of the weighing module.

In case of a weighing module of a single nest, the weighing module is preferably configured to determine the weight of a poultry animal, for example, on the basis of the increase of the weight resulting from the poultry animal entering the single nest and/or the stay of a poultry animal on the floor of the weighing module.

In case of a weighing module for a group nest, the weighing module is preferably configured to determine the value of a total weight of the poultry on the floor of the weighing module. Preferably, the weighing module of a group nest is configured to determine the value of a weight of an individual poultry animal, for example, on the basis of a change of the total weight of the poultry on the floor of the weighing module. Such a change of the total weight will especially occur when a poultry animal steps onto/into the weighing module or the nest and/or leaves. Thus, the weight of an individual poultry animal can be inferred from such a total weight difference.

Preferably, when determining a value of a weight of an individual poultry animal, the weighing module is configured to execute a comparison with a maximum value and/or a minimum value and/or an admissible value range for the weight. Thus, incorrect measurements, which may, for example, be caused due to two or more poultry animals entering and/or leaving the group nest simultaneously, can be detected and treated separately, for example, by excluding such incorrect measurements and/or deleting them and/or marking them. Such a minimum value and/or a maximum value and/or a value range may also be expressed as a deviation percentage, for example of up to 20%, from a predefined value and/or an average value. Preferably, the minimum value and/or the maximum value and/or the value range are adjustable and/or changeable. This has the advantage that the fact that the (average) weight of the poultry which changes during their stay in the poultry house (usually it increases) can be taken into account.

Another preferred embodiment requires that the weighing module is configured to detect the laying of an egg by a poultry animal on the weighing module from the data determined by the weighing element(s) based on a weight difference. If the poultry animal is on the weighing module and lays an egg, this egg preferably leaves the floor of the weighing module, for example by rolling, which can also be facilitated especially by a slanted arrangement of the floor of the weighing module. Thus, the weight on the floor of the weighing module is reduced by the weight of the laid egg. Preferably, a minimum value, a maximum value, and/or a value range is predetermined and/or may be predetermined for the weight difference on the basis of which a value for the weight of an egg is determined. Since an egg will usually have a significantly lower weight than a poultry animal, this allows for an easy differentiation between the weight of a poultry animal and the weight of an egg. The detection of the laying of an egg is preferably usable for weighing modules for single nests and/or weighing modules for group nests.

Furthermore, it is preferably required that the weighing module is configured to detect the ingestion of feed by a poultry animal on the weighing module from the data determined by the weighing element(s), in particular on the basis of a weight difference.

A preferred embodiment requires that the floor is designed as a grating structure, for example as a grate.

Another preferred embodiment is characterized by a protective structure, which is arranged and designed to protect the weighing element from dirt. Several protective structures may be provided as well. Preferably, one protective structure per mounting element is provided in order to protect the weighing element arranged at the mounting element from dirt. A protective structure designed as a slanted cover or an impact plate, which offers in particular protection from dirt falling down, such as droppings, is particularly preferred.

Pursuant to another aspect of the invention, the object mentioned above is achieved by means of a nest for a poultry management system, comprising a weighing module as described above. The nest may be a single nest or a group nest.

Preferably, the weighing module and/or the nest has an identification reader, for example an RFID reader. Thus, e.g., an identification number of the poultry animal can be identified.

Pursuant to another aspect of the invention, the above mentioned object is achieved by means of an animal holding installation, in particular by an installation for the individual feeding of poultry, comprising a weighing module as described above.

Preferably, the animal holding installation, the installation for the individual feeding of poultry, in particular, comprises a feed provision arrangement. The feed provision arrangement preferably comprises a feed pan and/or a feed supply. The feed supply may, for example, be designed as an auger and/or spiral and/or comprise a pipeline. Preferably, the feed provision arrangement is configured to determine an amount of provided feed. This may, for example, be achieved through a dosing device, which may, for example, be designed as a volume dosing feeder, and/or through a feed weighing device. The amount of provided feed may, in particular, serve as a reference value for a feed ingestion determined by means of weight determination. Preferably, the feed provision arrangement, the feed pan in particular, is arranged and/or designed in such a way that the feed can only be removed from the feed provision arrangement through the ingestion of feed by the poultry. Preferably, the feed provision arrangement, the feed pan in particular, is designed in such a way that it is prevented or reduced that, while the poultry are feeding, feed is pushed out and/or falls out of the feed provision arrangement, the feed pan in particular. The feed pan is, in particular, designed and/or arranged in such a way that feed pushed out of it cannot fall onto the weighing module, especially not onto the floor of the weighing module supported by one or several weighing elements.

Furthermore, the animal holding installation comprises an identification reader, such as an RFID reader. Thus, e.g., an identification number of the poultry animal can be identified.

Pursuant to another aspect of the invention, the object mentioned above is achieved by means of a method of weighing poultry, in particular, in a nest-integrated manner, comprising the steps of providing an above described weighing module and/or an above described nest and/or an above described animal holding installation, weighing a poultry animal during its stay on the weighing module and/or in the nest by means of the weighing module and/or in the animal holding installation by means of the weighing module.

The method is preferably realized by determining a value for a weight of a poultry animal from the data determined by the weighing element(s), and/or by determining a value for a weight of a poultry animal on the basis of a total weight difference, and/or detecting the laying of an egg by a poultry animal on the weighing module from the data determined by the weighing element(s), in particular on the basis of a weight difference, and/or determining the feed ingestion by a poultry animal on the weighing module from the data determined by the weighing element(s), in particular on the basis of a weight difference.

Pursuant to another aspect of the invention, the object mentioned above is achieved by means of a method of determining the feed ingestion of poultry, comprising the steps of identifying a poultry animal that has entered an installation for the individual feeding of poultry, preferably based on a transponder attached to or implanted into the poultry animal, determining a value for an entry weight of the poultry animal when it enters the animal holding installation, in particular by means of the above described weighing module, determining an amount of provided feed, in particular by measuring the weight of dosed feed, determining a value for an exit weight of the poultry animal when it leaves the animal holding installation, in particular by means of an above described weighing module.

The method of determining the feed ingestion of poultry preferably comprises the step of determining a feed ingestion of the poultry animal on the basis of the difference between the entry and exit weight. Furthermore, the method of determining the feed ingestion of poultry preferably comprises the step of comparing the determined feed ingestion with the determined amount of provided feed, wherein preferably a warning signal will be generated if the determined feed ingestion deviates from the determined amount of provided feed.

Pursuant to another aspect of the invention, the above mentioned object is achieved by means of the use of an above described weighing module and/or an above described nest for, in particular, a nest-integrated weighing of poultry and/or an above mentioned animal holding installation for weighing poultry and/or for determining a feed ingestion.

Regarding the advantages, possible versions and realization details of these further aspects of the invention and its embodiments, reference is made to the previous description of the respective features of the weighing module.

BRIEF DESCRIPTION OF THE DRAWINGS

One preferred embodiment of the invention is, by way of example, described by means of the attached figures. The following is shown in FIG. 1 is a three-dimensional view of a poultry house;

FIG. 3 is a cross section of the poultry house along the section plane A-A pursuant to

FIG. 2;

DETAILED DESCRIPTION OF THE PREFERRED EMBODIMENTS

Figure 1:
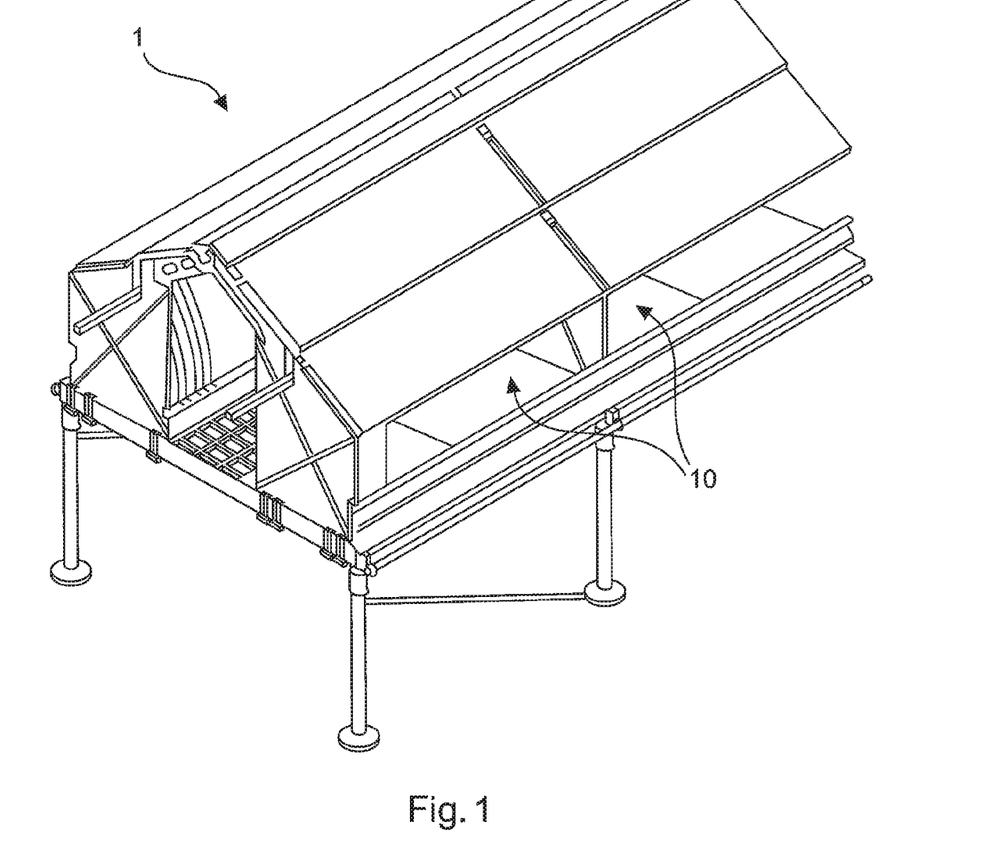
Figure 2:
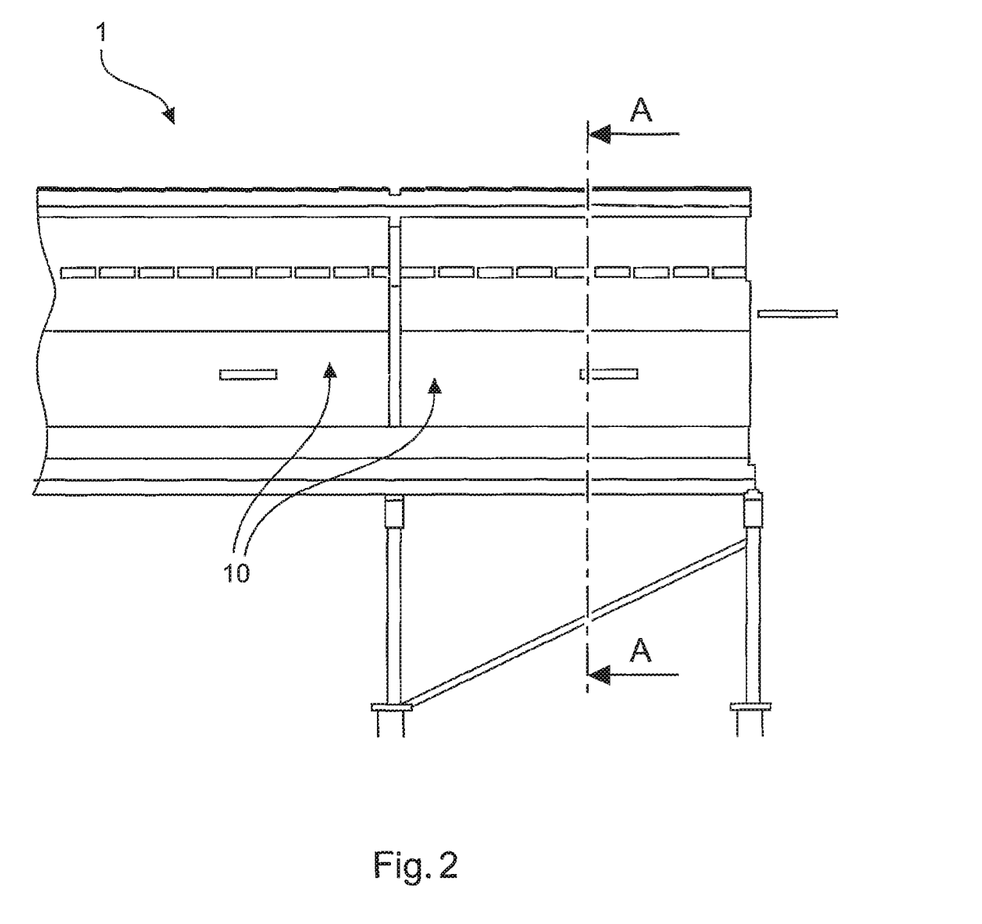
FIG. 2 is a lateral view of the poultry house pursuant to FIG. 1.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 3:
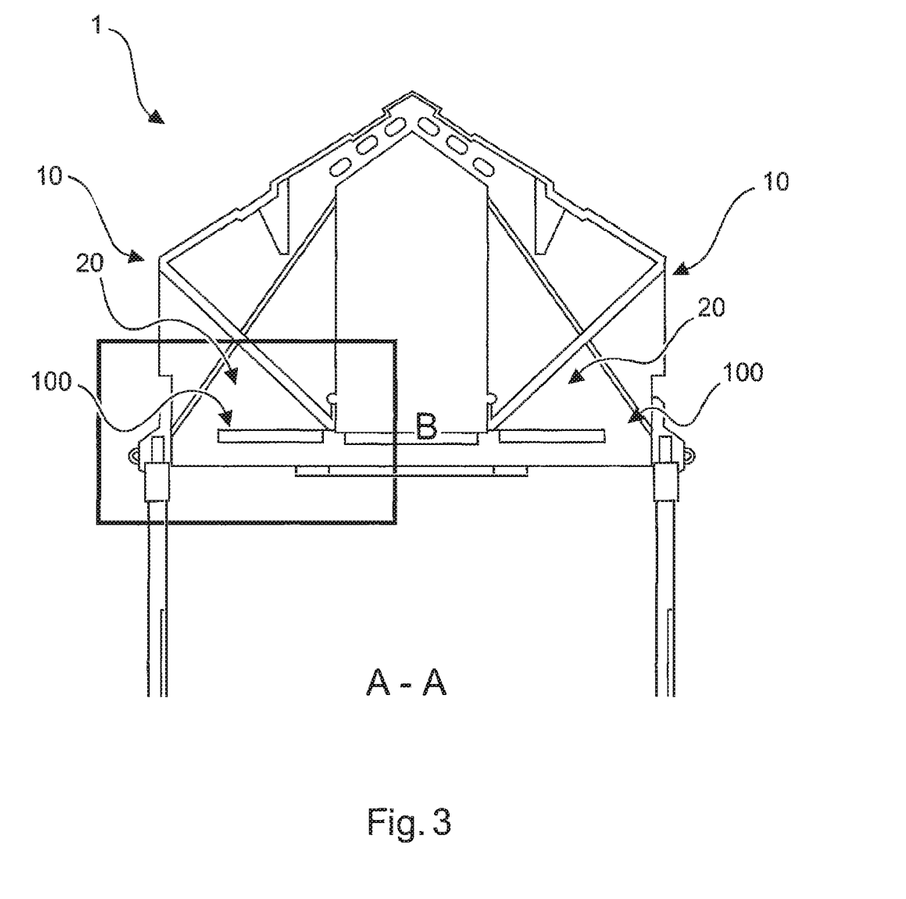
Figure 4:
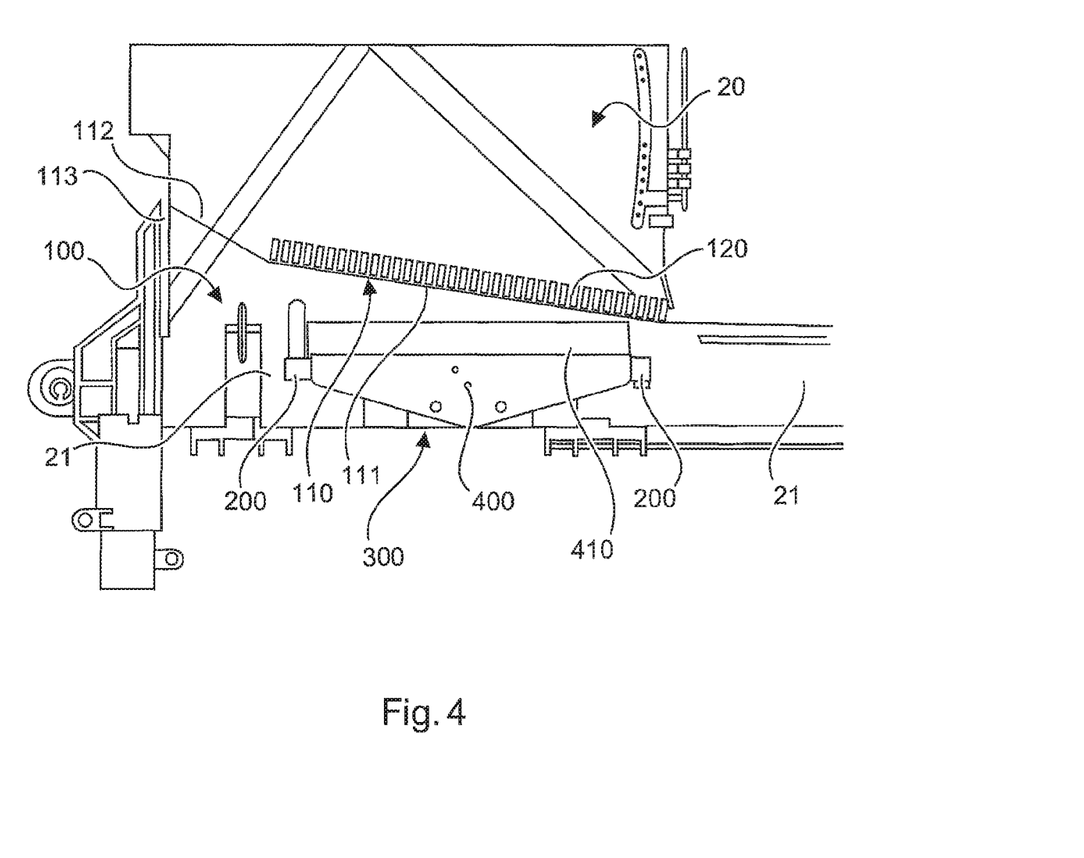
FIG. 4 is a magnification of section B pursuant to FIG. 3.

FIGS. 1-4 show a poultry house 1 with animal holding areas 10. As can be seen in FIGS. 3 and 4, in particular, weighing modules 100 are arranged in nests 20 of the animal holding areas 10. FIGS. 5-8 show an exemplary embodiment of such a weighing module 100 in more detail.

In a poultry house 1, for example, for broiler breeders, usually several animal holding areas 10 will be provided. Nests 20 with a nest housing 21 are provided in the animal holding areas 10.

At the nest housing 21, a weighing module 100 is mounted via a mounting device 300, as can be seen in FIG. 4. In FIG. 4, a mat insert 120 is arranged on the floor 110 of the weighing module 100, which is designed as a grating element. While a mat insert 120 is not shown in FIGS. 5-8, it may be provided in those cases as well.

As can be seen in FIGS. 4-8, in particular, the weighing module 100 is designed as follows: The weighing module 100 comprises a floor 110 designed as a grating element or grate. Poultry may either stay directly on the floor 110 or on a mat insert 120 arranged on the floor 110.

Furthermore, the weighing module 100 comprises a mounting device 300 with two mounting elements 310. The two mounting elements 310 are arranged on opposite sides or edges of the weighing module 100, namely, in the illustrated example, on the two opposite short sides of the essentially rectangular weighing module 100.

One weighing element 200, in the form of a weighing cell, is arranged on the respective opposite ends of the mounting elements 310, respectively. All in all, the weighing module 100 comprises four weighing elements 200, which are located in the area of the corners of the essentially rectangular floor 110 of the weighing module 100.

The floor 110 of the weighing module 100 is supported by the four weighing elements 200 at the mounting device 300.

Figure 5:
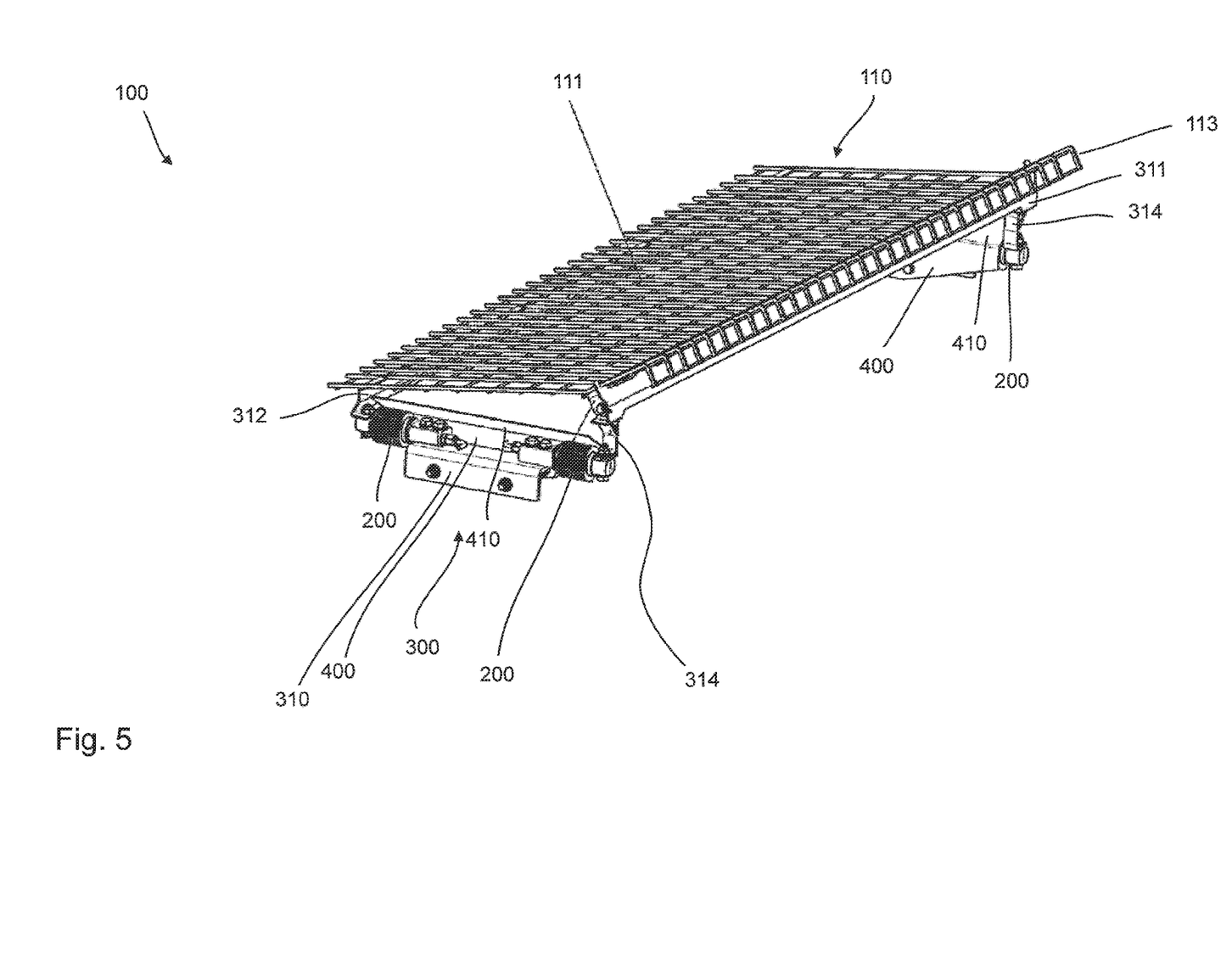
FIG. 5 is a three-dimensional view of an exemplary embodiment of a weighing module.
Figure 6:
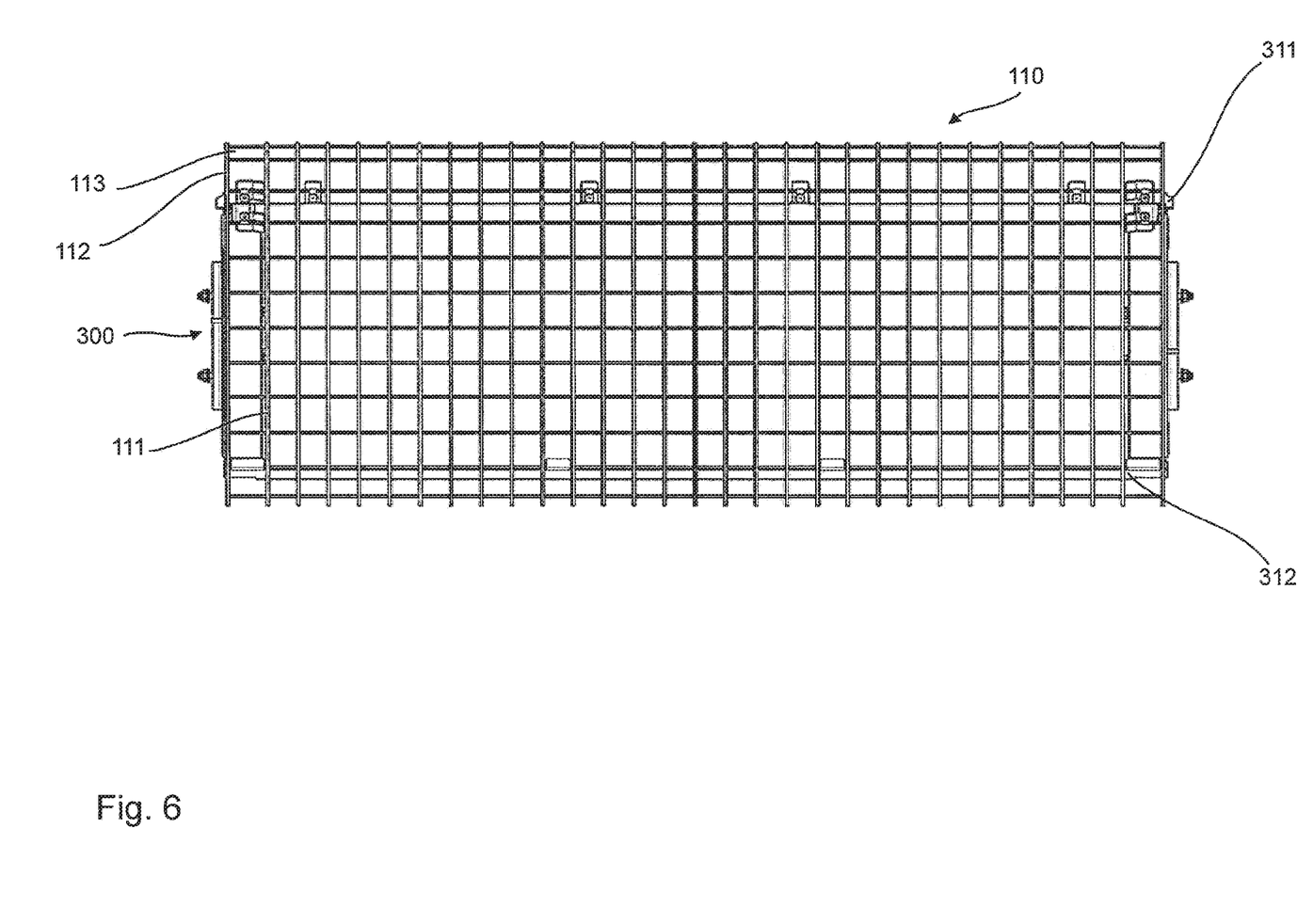
FIG. 6 is a top view of the weighing module pursuant to FIG. 5.
Figure 7:
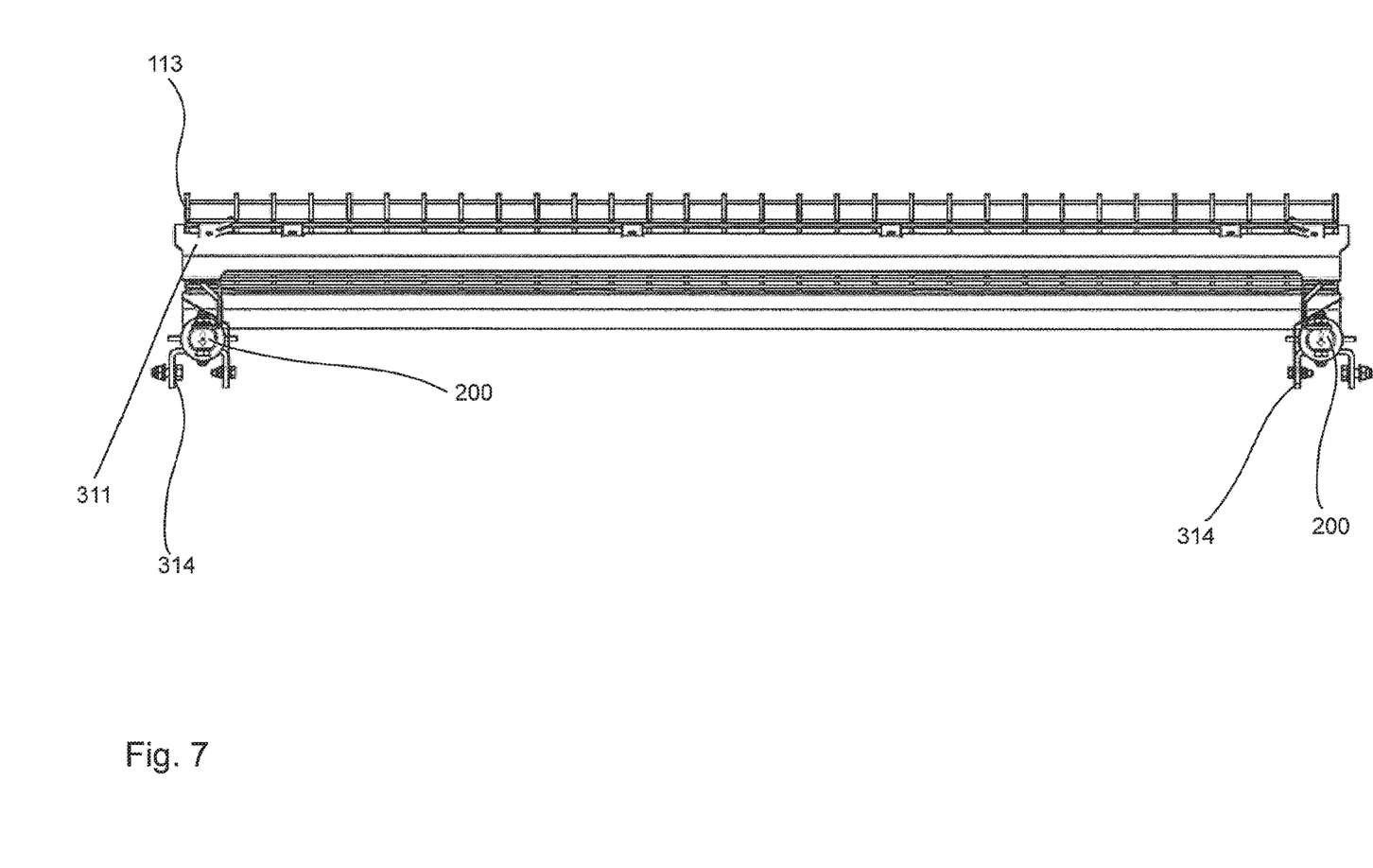
FIG. 7 is a lateral view of the long side of the weighing module pursuant to FIG. 5.
Figure 8:
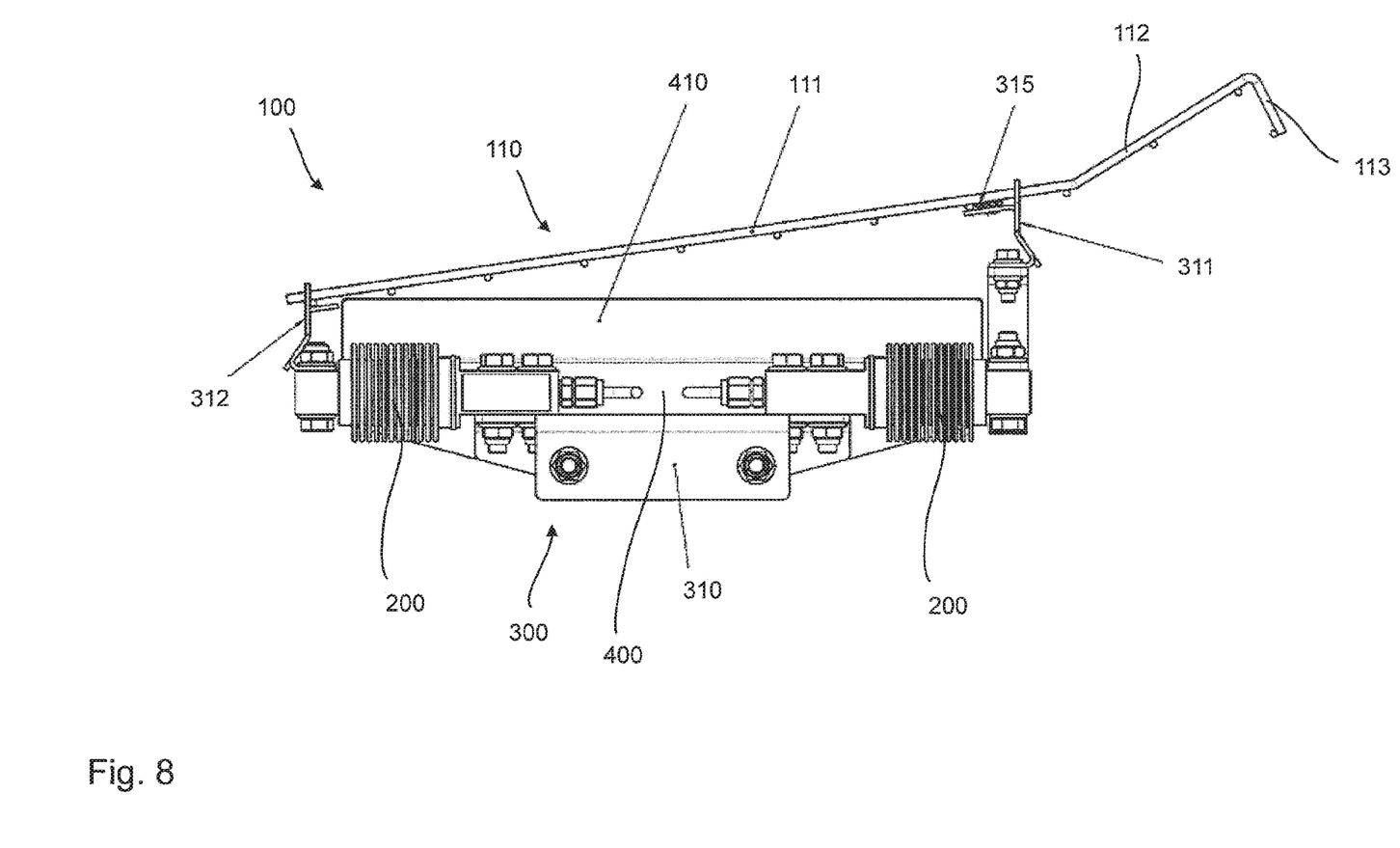
FIG. 8 is a front view of the short side of the weighing module pursuant to FIG. 5.

As can be seen in FIGS. 4, 5, and 8, in particular, during operation, the floor 110 is slanted towards the horizontal. The floor 110 comprises a holding area 111, which is slanted towards the horizontal. Furthermore, the floor 110 comprises an end area 112, which is slanted both towards the holding area 111 and towards the horizontal. The end area 112 is more slanted towards the horizontal than the holding area 111. A downward chamfer 113 is located at the end of the end area 112.

During operation, the lower edge of the floor 110 is attached to a guide rail 312, which, in turn, is connected to the weighing elements 200 located in the area of the corners. During operation, the upper edge of the floor 110, which is opposite to the lower edge, is connected to the weighing elements 200 located in the area of the corners via clamps 315, a guide rail 311, and via spacer elements 314 in the form of U-profiles. As can be seen in FIGS. 4, 5, 6, and 8, in particular, in this case, a side or edge of the floor 110 may, in particular, also be an area at a distance from the respective end of the floor 110, in which the guard rails 312, 311 may be arranged. Especially, the area between the holding area 111 and the end area 112 is also considered the upper edge of the floor 110.

Furthermore, the weighing module 100 comprises two protective structures 400, which are arranged and designed to protect the weighing element 200 from dirt. Per mounting element 310, one protective structure 400 is provided, which is arranged at the mounting element 310, and protects the weighing elements 200 arranged at the mounting element 310. To this end, the protective structure 400 has a slanted cover 410, which offers, in particular, protection from falling dirt, for example, droppings.

The weighing module 100 allows for a nest-integrated weighing of the poultry which are indirectly or directly on the floor 110 of the weighing module 100. This allows for a particularly advantageous, precise, and gentle determination of the weight of the poultry, since usually individual poultry animals will stay on the floor 110 of the weighing module 100 in a nest 20 and will usually be relatively calm and not move much.

Figure 9:
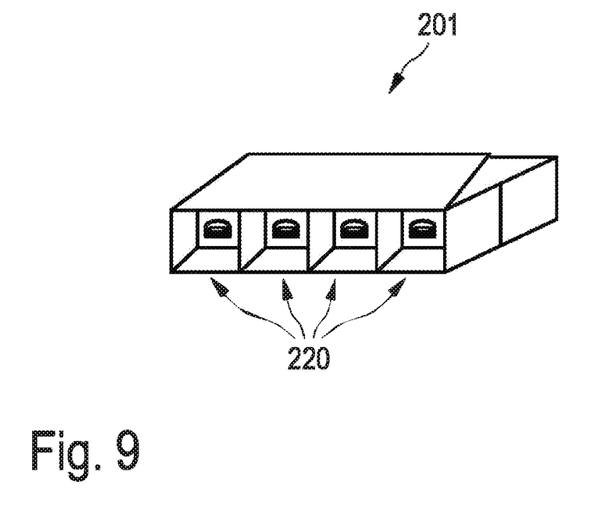
FIG. 9 is a three-dimensional view of a poultry house with an animal holding installation.
Figure 10:
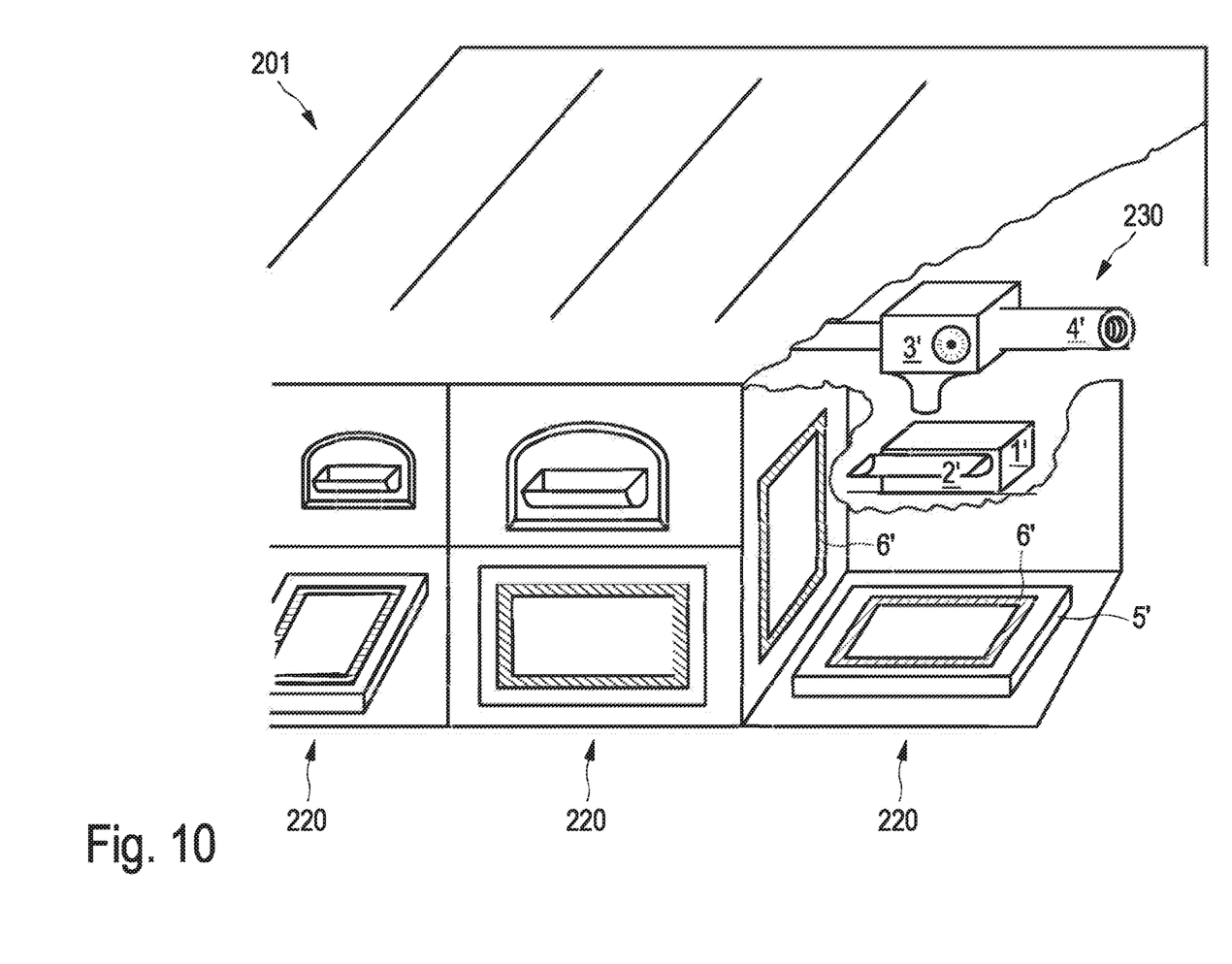
FIG. 10 is a magnified section cut out of FIG. 9.

FIGS. 9 and 10 show a poultry house 201 with several animal holding installations in the form of installations for the individual feeding of poultry 220. As can be seen in FIG. 10, in particular, weighing modules 5' are provided in the installations for the individual feeding of poultry 220. A weighing module 100, as shown in FIGS. 5-8, may be used as weighing module 5'.

The installation for the individual feeding of poultry 220 shown in the cut out partial area of FIG. 10 comprises a feed provision arrangement 230 comprising a feed pan 1', 2'. In the example shown in FIG. 10, the latter is designed as a tilting pan, wherein other designs are possible as well. The feed pan 1', 2' is supplied by a feed supply 4', which is configured to determine an amount of provided feed. To this end, a dosing device in the form of a volume dosing feeder 3' is provided.

Furthermore, the installation for the individual feeding of poultry 220 comprises an identification reader, such as an RFID reader, which may, for example, be installed at one of the positions referred to as 6', 6" in FIG. 10.

The installation for the individual feeding of poultry 220 allows for a comparison between the entry weight and the exit weight of a poultry animal. Thus, a weight change can be determined that allows for conclusions regarding the feed ingestion. If, at the same time, the amount of provided feed is determined by means of the dosing device in the form of the volume dosing feeder 3', control can be exercised in this regard. The identification reader makes it possible to identify the poultry so that the feed ingestion can be assigned to the individual animal.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A weighing module for a nest in a poultry management system comprising:
    a floor for receiving poultry or a nesting pad; and
    a mounting device by which the weighing module is adapted for attachment to an animal holding installation;
    at least two weighing elements each comprising a first bracket attached to the floor, a second bracket attached to the animal holding installation, and a weighing cell, the weighing cell being disposed between the first bracket and the second bracket, whereby the floor is supported by and mounted to the animal holding installation via the at least two weighing elements, said floor of the weighing module comprising two opposing sides and being supported by the at least two weighing elements each disposed on one of the opposing sides of the floor; wherein the weighing module is in data communication with an evaluation unit; and wherein the evaluation unit executes a comparison of a measured weight of the weight cell with a maximum value, a minimum value, or an admissible value range for a weight of a poultry animal when determining a value of the weight of the poultry animal.

2. The weighing module for a nest in a poultry management system of claim 1, wherein the animal holding installation is a nest installation.

3. The weighing module pursuant to claim 1, wherein, during operation, the floor is slanted in relation to a horizontal plane.

4. The weighing module pursuant to claim 1, wherein the floor is supported by four weighing elements.

5. The weighing module pursuant to claim 1, wherein, during operation, an upper side edge of the floor and a lower side edge of the floor are each attached to one of a first and second guide rail, respectively;
    wherein during operation, the upper side edge of the floor is supported by a spacer element; and
    wherein a transmission device is arranged and configured to transmit data determined by the at least two weighing elements.

6. The weighing module pursuant to claim 1, wherein the weighing module is configured to determine a value for a weight of a poultry animal from data determined by the at least two weighing elements, and to determine a value for a weight of a poultry animal on the basis of a total weight difference; and
    wherein the weighing module is configured to detect the laying of an egg by a poultry animal on the weighing module from the data determined by the at least two weighing elements based on a weight difference.

7. The weighing module pursuant to claim 1, wherein the weighing module is configured to determine a value for a weight of a poultry animal from data determined by the least two weighing elements, and to determine a value for a weight of a poultry animal on the basis of a total weight difference, and to determine the ingestion of feed by a poultry animal on the weighing module from the data determined by the at least two weighing elements.

8. The weighing module pursuant to claim 1, wherein the floor is designed as a grating structure, and the weighing module further comprises a protective structure arranged and designed to protect the at least two weighing elements from dirt.

9. The weighing module pursuant to claim 1, further comprising an identification reader for determining an identification number of the poultry animal.

10. The weighing module weighing module pursuant to claim 1, wherein the weighing module also executes a comparison with a maximum value, a minimum value, or an admissible value range for a weight of an egg when detecting the laying of an egg by a poultry animal.

11. A nest for a poultry management system comprising a weighing module pursuant to claim 1.

12. The nest for a poultry management system pursuant to claim 11, further comprising an identification reader for determining an identification number of the poultry animal.

13. An animal holding installation for the individual feeding of poultry animals, the animal holding installation comprising a weighing module pursuant to claim 1.

14. The animal holding installation pursuant to claim 13, further comprising:
a feed provision arrangement, wherein the feed provision arrangement is configured to determine an amount of provided feed; and
an identification reader is configured to determine an identification number of the poultry animal.

15. A method of weighing poultry animals, comprising the steps of: providing a weighing module comprising a floor for receiving poultry or a nesting pad, and a mounting device within which the weighing module is adapted for attachment to an animal holding installation, wherein the floor is supported by at least two weighing elements mounted to the animal holding installation, wherein each of the at least two weighing elements comprise a first bracket attached to the floor, a second bracket attached to the animal holding installation, and a weighing cell, the weighing cell being disposed between the first bracket and the second bracket, said floor of the weighing module comprising two opposing sides and being supported by the at least two weighing elements each disposed on one of the opposing sides of the floor, and wherein the weighing module is in data communication with an evaluation unit;
weighing of a poultry animal during its stay on the weighing module or in a nest installation by means of the weighing module or in the animal holding installation by means of the weighing module; and
executing a comparison of a measured weight of the weighing cell via the evaluation unit with a maximum value, a minimum value, or an admissible value range for a weight of a poultry animal when determining a value of the weight of the poultry animal.

16. The method of weighing poultry animals pursuant to the claim 15, further comprising the step of:

determining a value for the weight of a poultry animal from the data determined by the at least two weighing elements.

17. The method of weighing poultry animals pursuant to the claim 15, further comprising the step of:
detecting the laying of an egg by a poultry animal on the weighing module from the data determined by the at least two weighing elements.

18. The method of weighing poultry animals pursuant to the claim 15, further comprising the steps of:
determining the ingestion of feed by a poultry animal on the weighing module from the data determined by the at least two weighing elements.

19. A method of determining the feed ingestion of poultry animals, comprising the steps of:
identifying a poultry animal which has entered the installation for the feeding of poultry by means of a transponder attached to or implanted into the poultry animal,
determining a value for an entry weight of the poultry animal when it enters the animal holding installation by means of a weighing module comprising a floor for receiving poultry or a nesting pad and a mounting device by which the weighing module is adapted for attachment to an animal holding installation, wherein the floor is supported by at least two weighing elements mounted to the animal holding installation, wherein each of the at least two weighing element comprises a first bracket attached to the floor, a second bracket attached to the animal holding installation, and a weighing cell, the weighing cell being disposed between the first bracket and the second bracket, said floor of the weighing module comprising two opposing sides and being supported by the at least two weighing elements each disposed on one of the opposing sides of the floor, and wherein the weighing module is in data communication with an evaluation unit;
determining an amount of provided feed by measuring the weight of dosed feed, and determining a value for an exit weight of the poultry animal when it leaves the animal holding installation by means of the weighing module; and
executing a comparison of a measured weight of the weighing cell via the evaluation unit with a maximum value, a minimum value, or an admissible value range for a weight of a poultry animal when determining a value of the weight of the poultry animal.

20. The use of a weighing module pursuant to claim 1 for the weighing of poultry or for determining a feed ingestion, comprising the steps of:
identifying a poultry animal which has entered the installation for the feeding of poultry by means of a transponder attached to or implanted into the poultry animal;
determining a value for an entry weight of the poultry animal when it enters the animal holding installation by means of a weighing module comprising the floor for receiving poultry or a nesting pad and at least two weighing elements by which the weighing module is attached to the animal holding installation, wherein each of the two weighing elements comprise a first bracket attached to the floor, a second bracket attached to the animal holding installation, and a weighing cell, the weighing cell being disposed between the first bracket and the second bracket, said floor of the weighing module comprising two opposing sides and being supported by the at least two weighing elements each disposed on one of the opposing sides of the floor, and an evaluation unit executes a comparison of a measured weight of the weighing cell with a maximum value, a minimum value, or an admissible value range for a weight of a poultry animal when determining a value of the weight of the poultry animal; and determining an amount of provided feed by measuring the weight of dosed feed, and determining a value for an exit weight of the poultry animal when it leaves the animal holding installation by means of the weighing module.

21. A weighing module for a nest in a poultry management system comprising:

a floor for receiving poultry or a nesting pad; and a mounting device by which the weighing module is adapted for attachment to a nest installation of an animal holding installation;

wherein the floor is supported by at least two weighing elements mounted to the animal holding installation, each of the at least two weighing elements comprising a first bracket attached to the floor, a second bracket attached to the animal holding installation, and a weighing cell, the weighing cell being disposed between the first bracket and the second bracket, and comprising a weighing cell, such that each of the at least two weighing elements is disposed between the mounting device and the floor, said floor of the weighing module comprising two opposing sides and being supported by the at least two weighing elements each disposed on one of the opposing sides of the floor, and, during operation, the floor is slanted in relation to a horizontal plane;

wherein the weighing module is in data communication with an evaluation unit; and wherein the evaluation unit executes a comparison of a measured weight of the weighing cell with a maximum value, a minimum value, or an admissible value range for a weight of a poultry animal when determining a value of the weight of the poultry animal.

22. A weighing module for a nest in a poultry management system comprising:

a floor for receiving poultry or a nesting pad; and a mounting device by which the weighing module is adapted for attachment to an animal holding installation;

wherein the floor is supported by at least two weighing elements and each of the at least two the weighing elements is arranged between the mounting device and floor, wherein each of the at least two weighing elements comprise a first bracket attached to the floor, a second bracket attached to the animal holding installation, and a weighing cell, the weighing cell being disposed between the first bracket and the second bracket, such that the at least two weighing elements is mounted to the animal holding installation, said floor of the weighing module comprising two opposing sides and being supported by the at least two weighing elements each disposed on one of the opposing sides of the floor;

wherein the weighing module is in data communication with an evaluation unit;

wherein the mounting device comprises at least two mounting elements, one each of the mounting elements being arranged on one of two opposite sides of the floor; and wherein the weighing module comprises a weighing cell and the evaluation unit executes a comparison of a measured weight of the weighing cell with a maximum value, a minimum value, or an admissible value range for a weight of a poultry animal when determining a value of the weight of the poultry animal.

23. A weighing module for a nest in a poultry management system comprising:

a floor for receiving poultry or a nesting pad; and a mounting device by which the weighing module is adapted for attachment to an animal holding installation;

wherein the floor is supported by at least two weighing elements mounted to the animal holding installation, wherein each of the at least two weighing elements comprises a first bracket attached to the floor, a second bracket attached to the animal holding installation, and a weighing cell, the weighing cell being disposed between the first bracket and the second bracket, said floor of the weighing module comprising two opposing sides and being supported by the at least two weighing elements each disposed on one of the opposing sides of the floor;

wherein the weighing module is in data communication with an evaluation unit; and wherein the evaluation unit executes a comparison of a measured weight of the weighing cell with a maximum value, a minimum value, or an admissible value range for a weight of an egg when detecting the laying of an egg by a poultry animal.

* * * * *

UNITED STATES PATENT AND TRADEMARK OFFICE
CERTIFICATE OF CORRECTION

PATENT NO. : 11,129,368 B2
APPLICATION NO. : 15/728627
DATED : September 28, 2021
INVENTOR(S) : Schurmann et al.

Page 1 of 1

It is certified that error appears in the above-identified patent and that said Letters Patent is hereby corrected as shown below:

In the Claims

Column 12, Claim 19, Line 28:
"element comprises" should be --elements comprise--

Column 13, Claim 22, Line 47:
"at least two the weighing" should be --at least two weighing--

Column 14, Claim 22, Line 6:
"is" should be --are--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*